(12) United States Patent
Meschter et al.

(10) Patent No.: US 8,197,566 B2
(45) Date of Patent: Jun. 12, 2012

(54) GASIFIER ADDITIVES FOR IMPROVED REFRACTORY LIFE

(75) Inventors: Peter Joel Meschter, Niskayuna, NY (US); Paul Stephen Dimascio, Greer, SC (US)

(73) Assignee: General Electric Company, Niskayuna, NY (US)

( * ) Notice: Subject to any disclaimer, the term of this patent is extended or adjusted under 35 U.S.C. 154(b) by 585 days.

(21) Appl. No.: 12/330,180

(22) Filed: Dec. 8, 2008

(65) Prior Publication Data

US 2010/0139167 A1 Jun. 10, 2010

(51) Int. Cl.
*C10K 3/06* (2006.01)
*C10L 1/04* (2006.01)
*C21B 7/06* (2006.01)
*C21B 9/06* (2006.01)

(52) U.S. Cl. ............ 48/210; 208/14; 208/15; 75/301; 75/315

(58) Field of Classification Search .............. 208/14, 208/15; 48/210; 75/301, 315
See application file for complete search history.

(56) References Cited

U.S. PATENT DOCUMENTS

| 3,901,721 | A | 8/1975 | Doman |
| 4,039,344 | A | 8/1977 | Nishikawa |
| 4,095,960 | A | 6/1978 | Schuhmann, Jr. |
| 4,572,085 | A | 2/1986 | Hepworth |
| 5,578,094 | A | 11/1996 | Brooker et al. |
| 6,455,102 | B1* | 9/2002 | Kobayashi et al. ........... 427/140 |
| 6,893,992 | B2 | 5/2005 | Doza et al. |
| 6,982,233 | B2 | 1/2006 | Buchberger et al. |
| 2006/0211566 | A1 | 9/2006 | Champion et al. |
| 2007/0141348 | A1 | 6/2007 | Witzmann et al. |
| 2008/0216603 | A1* | 9/2008 | Thompson et al. ........... 75/301 |

FOREIGN PATENT DOCUMENTS

| EP | 1443033 | 8/2004 |
| GB | 2116201 A | 9/1983 |
| JP | 5043306 | 2/1993 |
| WO | 8403516 A1 | 9/1984 |
| WO | 0229323 A1 | 4/2002 |

OTHER PUBLICATIONS

J. Rawers, K. Collins and M. Peck; Oxides reactions with a High-chrome sesquioxide refractory; Journal of Materials Science;36, No. 20/ pp. 4837-4843,Oct. 2001.
PCT/US2009/063539 Search Report, May 20, 2010.
PCT/US2009/063539 Written Opinion, May 20, 2010.

* cited by examiner

*Primary Examiner* — Walter D Griffin
*Assistant Examiner* — Vishal Vasisth
(74) *Attorney, Agent, or Firm* — Ann M. Agosti

(57) ABSTRACT

Embodiments disclosed herein provide hydrocarbon additives and methods of making and using the same. The additives are suitable for use in conjunction with gasifiers, furnaces, or other high-temperature vessels. The additives may be part of an input stream to a reaction vessel of a hydrocarbon gasifier. The additives may include materials that at least partially reduce the infiltration of slag into the refractory material.

9 Claims, 2 Drawing Sheets

GASIFIER ADDITIVES FOR IMPROVED REFRACTORY LIFE

BACKGROUND

The invention relates generally to gasifier additives and, more particularly, to gasifier additives for reducing slag penetration into a refractory lining of a gasifier.

Coal and other hydrocarbons may be subjected to partial combustion to produce gases, e.g., CO and $H_2$, that are useful as fuels and starting materials for chemical syntheses. This gasification typically takes place in large furnaces that allow the hydrocarbon to be partially burned at high temperatures to produce the desired gaseous products of the reaction. In addition to the desired products, the by-products of the reaction may include waste products, such as slag. Slag is a blend of inorganic oxides, initially present as minerals within the hydrocarbon feed, that is produced as a viscous liquid by-product in a slagging gasifier when the coal, coke, or other hydrocarbon is partially oxidized. The slag may, for example, contain silica, aluminum oxide, calcium oxide, iron oxide, magnesium oxide, and other inorganic oxides.

To contain the heat of the reaction, the walls of the gasifier may be lined with a refractory material that is able to withstand high temperatures. Typically, the refractory material is porous. For example, common refractory materials are sintered bricks with highly connected pore structures. These materials are vulnerable to damage by the slag byproduct of the gasification reaction. As the liquid slag byproduct flows along the walls of the gasifier, it infiltrates into the pores in the refractory material. This infiltration may cause degradation of the refractory material through cracking/spalling, grain separation, and/or dissolution.

As a result of slag infiltration, the refractory material that lines a gasifier may degrade relatively quickly and may need to be replaced several times during the life span of the gasifier. The refractory material may be replaced by workers entering the gasifier and removing the damaged bricks or, in certain cases, the entire lining. Because the gasifiers are operated at very high temperatures, this involves shutting the gasifier down and allowing it to cool for several days until workers can safely enter. Such replacement of the refractory material is generally costly, both in terms of the materials and labor involved and operating time lost, because the gasifier cannot run for days to weeks during the replacement process.

BRIEF DESCRIPTION

Provided herein is a feed material for a gasifier that includes a hydrocarbon; and an additive, wherein the additive includes a ferric oxide, a magnesium oxide, a manganese oxide, or a combination thereof, wherein the feed material is adapted to form liquid slag comprising at least 15% by weight of ferric oxide, magnesium oxide, manganese oxide or a combination thereof.

Also provided herein is a process for operating a gasifier that includes providing a feed material in an input stream to a gasifier, wherein the feed material includes a hydrocarbon and an additive comprising a ferric oxide, a magnesium oxide, a manganese oxide, or a combination thereof, and wherein the feed material is capable of forming a liquid slag including at least 15% by weight of ferric oxide, magnesium oxide, manganese oxide or a combination thereof; and operating the gasifier at a temperature higher than the melting temperature of the slag such that the feed material forms the liquid slag.

Also provided herein is a structure that includes a refractory material and a protective layer formed on the refractory material, wherein the protective layer includes iron, magnesium, or manganese.

Also provided herein is a process for modifying a feed material for a gasifier that includes determining the concentration of iron, magnesium, manganese, or a combination thereof in a hydrocarbon; and providing an additive, wherein the additive includes a sufficient amount of a ferric oxide, a magnesium oxide, a manganese oxide, or a combination thereof, such that when the additive is mixed with the hydrocarbon and exposed to a temperature higher than the melting temperature of the additive, a liquid slag including at least 15% by weight of ferric oxide, magnesium oxide, manganese oxide or a combination thereof is formed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein provide hydrocarbon additives and methods of making and using the same. The additives are suitable for use in conjunction with gasifiers, furnaces, or other high-temperature vessels. In an embodiment, the additives may be part of an input stream to a reaction vessel of a hydrocarbon gasifier. The additives may include materials that at least partially reduce the infiltration of slag into the refractory material.

In an embodiment, the additives may be used in conjunction with coal. The coal additives may reduce the penetration of liquid slag into the lining of the gasifier. In one embodiment, when coal additives enter the reaction area of a gasifier and are subjected to high temperatures, the mixture of naturally occurring coal slag and coal slag additives may react with the outer layers of the refractory material to form surface reaction layers that prevent deeper slag penetration into the refractory material. In some embodiments, these surface protective layers formed at the interface of the slag and the refractory material may include spinel layers, which are characterized by the general formula $XY_2O_4$.

Formation of the protective layer limits penetration of the liquid slag beneath the product layer and hence limits the depth of the zone in which degradation of the refractory brick by cracking and spallation, grain extraction, and/or dissolution, can occur. The rate of recession of the brick is reduced and its useful life increased by limiting the slag/brick reaction depth. An additional advantage provided by the coal additives is that the formation of the spinel layers or other protective layers may be continuous during the operation of the gasifier, as the coal additives may be continuously be fed into the reactor.

In some embodiments, the coal additives may be mixed with coal, and the mixture may generate the protective layers at the refractory material surface. In another embodiment, the coal additives may form protective layers in the absence of coal, for example the coal additives may form a synthetic slag that is capable of generating the protective layers.

Figure 1:
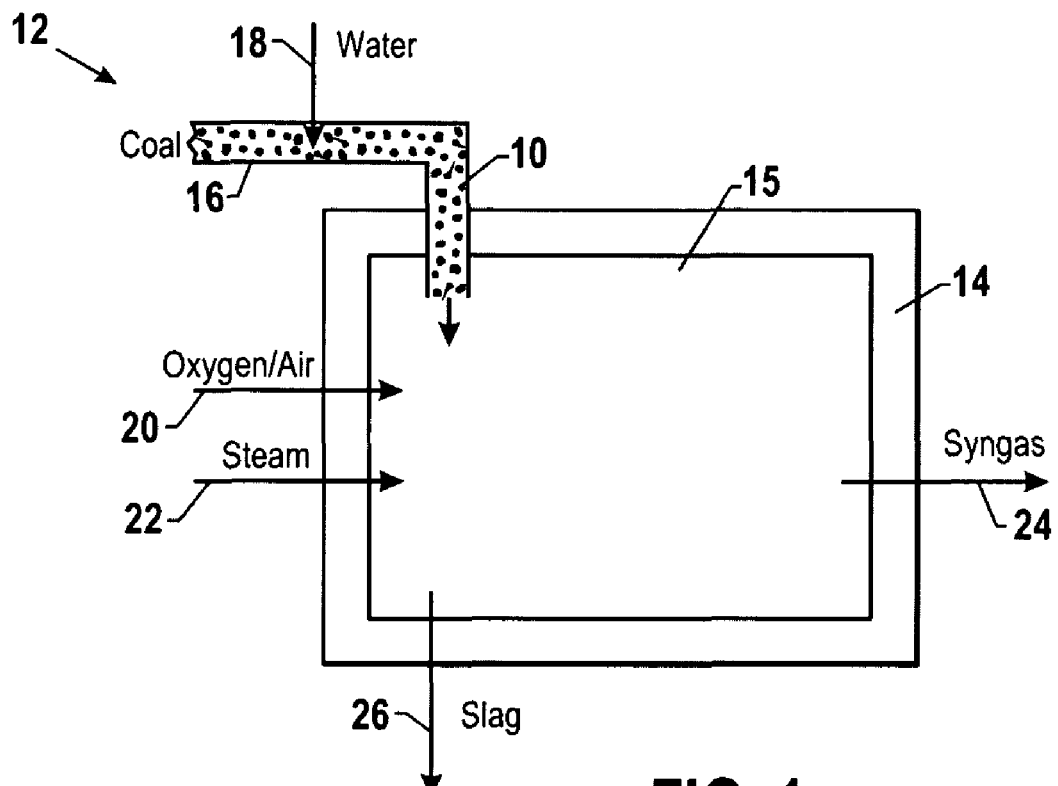
FIG. 1 is a diagram of an exemplary coal gasifier according to an embodiment.

In an exemplary embodiment shown in FIG. 1, coal additives 10 may be used in conjunction with a hydrocarbon gasifier, such as a coal gasifier 12. The coal gasifier 12 includes a lining of refractory material 14 surrounding a reaction space 15. The coal additives 10 or a feed material that includes coal and coal additives 10 may be introduced into the gasifier 12 through line 16. The coal additives 10 introduced through line 16 may enter the gasifier 12 and may be in particulate or slurry form and may be added concurrently or separately from the coal itself. For example, in one embodiment, the coal line 16 may also include a water line 18 for mixing the coal and coal additives 10 into a slurry. In addition, the coal line 16 may include any suitable mixing structures (not shown) for mixing the slurry to the appropriate specifications. Air, oxygen and/or steam may be introduced into the reaction space 15 through lines 20 and 22, respectively, to provide for the gasification of the coal. The reaction products, which may include carbon monoxide and hydrogen (i.e., syngas), may be discharged from the gasifier 12 through line 24. The inorganic constituents of the coal are discharged from the gasifier 12 through line 26, typically as a molten slag that is subsequently cooled and solidified.

The gasifier 12 may be any suitable gasifier, including a counter-current fixed bed gasifier, co-current fixed bed gasifier, a fluidized bed reactor, or an entrained flow gasifier. In addition, the gasifier may use any suitable carbon source in the reaction, including coal, coke, petroleum, biomass, and/or wood.

Figure 2:
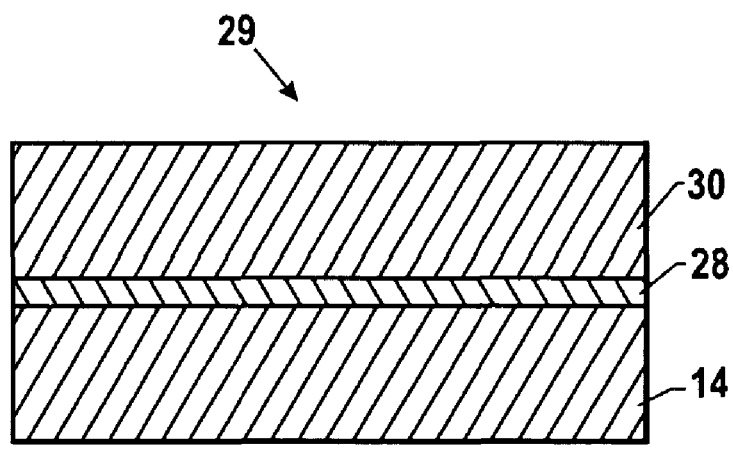
FIG. 2 is a cross-sectional view of an exemplary spinel layer at a slag-refractory interface according to an embodiment.

FIG. 2 shows a protected structure 29 that includes a protective layer 28 formed on a refractory material 14. In one embodiment, the liquid slag 30 formed from the melting of naturally occurring and additive minerals in a feed material may form protective layers 28 at the surface of a refractory material 14, shown in cross-section in FIG. 2. The molten slag 30 may be formed by operating the gasifier 12 so that the mixture of naturally occurring minerals in the coal, as well as the coal additive 10, melts. In some embodiments, the gasifier 12 may operate at about 1500° C. or greater and with an oxygen partial pressure of about $10^{-8}$ to $10^{-12}$ atm. As the molten slag 30 encounters the refractory material 14, certain chemicals in the slag 30 interact with the surface of the refractory material 14 to form protective layers, which may include layers such as spinel layers 28.

The refractory material 14 may include any suitable composition that may be formed into a desired shape suitable for lining a gasifier 12. In one embodiment, the refractory material 14 is a brick or block. In another embodiment, the refractory material 14 is a sintered brick or an as-fabricated brick. The refractory material 14 may be Aurex 90, a $Cr_2O_3$-rich $Cr_2O_3$—$Al_2O_3$ brick or Aurex95P (Harbison-Walker Refractories Limited, Moon Township, Pa., USA). Other suitable refractory bricks may include Zirchrom-90/Zirchrom-900 (Saint-Gobain, Savoie Refractaires, Venissieux Cedex, France).

The slag 30 forms a mixture that may include, among other components, any combination of $SiO_2$, $Al_2O_3$, CaO, FeO, MgO, MnO, $TiO_2$, $Na_2O$, $K_2O$. The composition of the slag may depend on the chemical composition of the hydrocarbon as well as the chemical composition of the additive 10. For example, coal from different regions of the world may contain different amounts of various additional chemicals, including Cl, S, V, Ni, P, etc. In other embodiments, biomass may include relatively high amounts of Cl. The composition of slag additives may have to be altered to take the presence of these additional elements into account.

The additive 10 may include any Fe, Mn, or Mg-bearing oxide such as FeO, $Fe_3O_4$, $Fe_2O_3$, $FeAl_2O_4$, MgO, $MgAl_2O_4$, MnO, $MnO_2$, $MnO_3$, $Mn_3O_4$, $Mn_2O_3$, mixtures thereof. In some embodiments, the coal additives 10 may have the effect of producing weight percentages of any combination of iron, magnesium, or manganese oxides in the resultant slag in excess of about 15%, in excess of about 20%, or more or in excess of about 25%. The additive 10 may be in the form of a powder or in the form of solid products, such as waste products, of other processes. Alternatively, the additive 10 may be mixed with water or any other liquid into a slurry.

In some embodiments, the product of slag/refractory reactions is a dense surface spinel phase of general formula (Fe, Mg,Mn)(Cr,Al)$_2O_4$. In other embodiments, the spinel layer may include $Fe_3O_4$, $MgAl_2O_4$, $MgCr_2O_4$, $FeCr_2O_4$, $Mn_3O_4$, $MnAl_2O_4$, $MnCr_2O_4$, or $FeAl_2O_4$. The additive 10 may be characterized by its ability to promote formation of spinel layers.

Table 1 shows the results of cup tests performed to determine the extent of penetration of slags of different compositions into a chromium-oxide refractory material. The synthetic slags labeled D1-D5, E1-E5, EG9150 in column 1 were made with predetermined concentrations of various oxides as shown in columns 2-9. The slags were heated to 1500° C. (1773 K), above the melting temperatures, and the depth of penetration of the liquid slag into a chromium-oxide refractory cup was measured for each slag composition as shown in column 11.

TABLE 1

Test slag compositions, cup test slag penetration results, and thermodynamically predicted amounts of spinel

| Slag label | Weight % | | | | | | | | (Fe2O3 + MgO) wt. % | Cup test penetration depth (mm) | Calculated spinel conversion (moles spinel/moles slag) |
| | SiO2 | Al2O3 | CaO | Fe2O3 | MgO | TiO2 | Na2O | K2O | | | |
| --- | --- | --- | --- | --- | --- | --- | --- | --- | --- | --- | --- |
| D1 | 38.8 | 26.3 | 4.0 | 21.7 | 5.8 | 1.2 | 0.9 | 1.4 | 27.5 | 5 | 0.203 |
| D2 | 62.2 | 21.1 | 4.4 | 2.6 | 6.3 | 1.2 | 0.9 | 1.4 | 8.9 | 13 | 0.000 |
| D3 | 52.6 | 17.9 | 4.1 | 21.4 | 0.6 | 1.2 | 0.9 | 1.4 | 22.0 | 7 | 0.058 |
| D5 | 40.5 | 22.9 | 25.2 | 7.2 | 0.6 | 1.2 | 0.9 | 1.4 | 7.8 | 20 | 0.000 |
| E1 | 54.7 | 18.6 | 15.3 | 7.3 | 0.6 | 1.2 | 0.9 | 1.4 | 7.9 | 20 | 0.000 |
| E2 | 40.5 | 22.9 | 12.6 | 14.4 | 6.0 | 1.2 | 0.9 | 1.4 | 20.4 | 5 | 0.146 |
| E3 | 47.3 | 23.2 | 10.1 | 13.2 | 2.8 | 1.2 | 0.9 | 1.4 | 16.0 | 10 | 0.055 |
| E4 | 44.4 | 30.2 | 16.6 | 2.4 | 3.0 | 1.2 | 0.9 | 1.4 | 5.4 | 20 | 0.013 |

TABLE 1-continued

Test slag compositions, cup test slag penetration results,
and thermodynamically predicted amounts of spinel

| | Weight % | | | | | | | | | | |
|---|---|---|---|---|---|---|---|---|---|---|---|
| Slag label | SiO2 | Al2O3 | CaO | Fe2O3 | MgO | TiO2 | Na2O | K2O | (Fe2O3 + MgO) wt. % | Cup test penetration depth (mm) | Calculated spinel conversion (moles spinel/moles slag) |
| E5 | 38.2 | 26.0 | 12.6 | 19.2 | 0.6 | 1.2 | 0.9 | 1.4 | 19.8 | 10 | 0.058 |
| EG9150 | 59.0 | 10.7 | 8.4 | 21.6 | 0.0 | 0.0 | 0.0 | 0.3 | 21.6 | 8 | 0.054 |

The depth of slag penetration was determined by examination of x-ray fluorescence (XRF) maps of concentrations of the major elements of the slag in the refractory cup material. Slags with little penetration were considered to have formed protective layers at the slag/refractory interface. For example, slags D5, E1, E4 penetrated all the way through the cup during the test, indicating that these slags did not form effective protective layers at the surface of the refractory material. The slags that exhibited much less penetration, as determined by XRF, were D1, D3, E2 and EG9150 These slags were characterized by having the sum of the weight percentages of iron and magnesium oxides in excess of 20%, as shown in column 10 of Table 1. Refractory resistance to penetration of slag was determined to have a proportional relationship to the amount of iron and magnesium oxides in the slag. Accordingly, slags D1 (27.5% total weight of iron and magnesium oxides), D3 (22.0%), E2 (20.4%) and EG9150 (21.6%) showed resistance to slag penetration. Slags D2 (8.9%), D5 (7.8%), E1 (7.9%), and E4 (5.4%) penetrated deeply into the refractory material. Slags with intermediate total iron and magnesium weight percentages showed generally intermediate degrees of penetration, for instance slag E3 (16.0%).

High-temperature thermodynamic calculations of slag/chromia brick reactions at 1500° C. (1773 K) under low oxygen partial pressures typical of coal gasification conditions were performed to predict the extent of spinel formation. The relative extent of spinel formation is shown in column 12 of Table 1 as moles spinel/moles liquid oxide. A correlation was found between a high conversion of liquid slag to spinel by chemical reaction with the refractory brick, and resistance to deep slag penetration. For instance, slags D1 and E2 were modeled to have high spinel formation numbers of 0.146-0.203 and the lowest levels of slag penetration into the refractory material, e.g., 5 mm. Slags D3, E3, E5, and EG9150 had intermediate spinel formation numbers of 0.054-0.058 and intermediate levels of slag penetration, e.g. 7-10 mm. Slags D2, D5, E1, E4 had lower spinel formation numbers of 0.000-0.013 and the highest levels of slag penetration, e.g. 13-20 mm.

Figure 3:
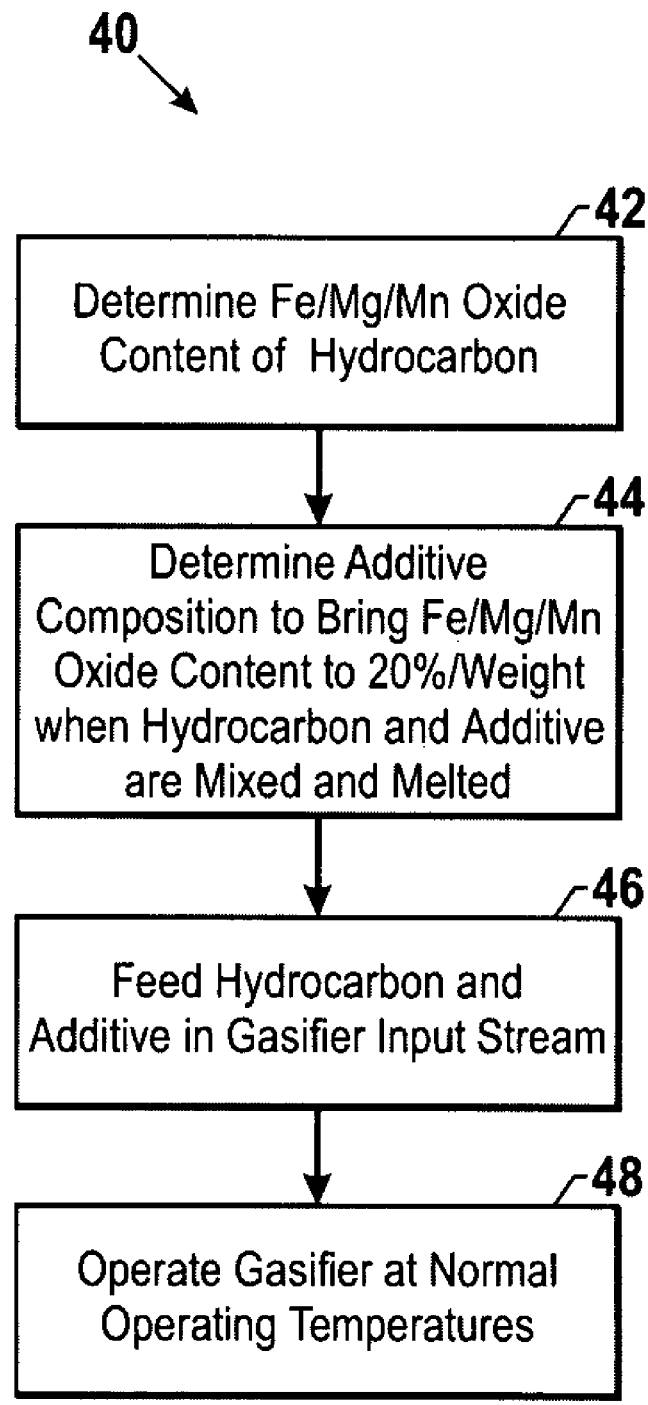
FIG. 3 is a flowchart of a method of modifying a feed material for a gasifier according to an embodiment.

In an embodiment, additives 10 may be designed to be used with particular batches of coal, as generally illustrated by the process 40 of FIG. 3. As noted, coal from different regions may differ in chemical composition. Since the (Fe +Mg) concentration of coal slags is variable, periodic testing of feed coal (step 42) will establish whether the (Fe +Mg), and in certain embodiments (+Mn), concentration is high enough to activate the protective spinel reaction mechanism. For example, a slag or ash byproduct of the coal may be tested to determine its chemical composition and the concentration of iron, magnesium, and/or manganese. If the (Fe +Mg) concentration is too low, Fe- and/or Mg-containing oxides in the form of an additive 10 can be provided to promote spinel formation (step 44). Alternatively, in one embodiment, an operator may determine that a particular batch of coal has adequate (Fe +Mg) levels to promote the beneficial spinel reactions at the refractory material without further slag additives.

The coal (or any hydrocarbon) and additive 10 may be added as an input in the coal line 20 of the gasifier 12 in step 46. The additive 10 may be in solid form or may be in the form of a slurry. The gasifier 12 is then operated at normal operating temperatures (step 48) to generate the molten slag 30 and the resultant spinel layers at the surface of the refractory material 14.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is

1. A feed material for a gasifier comprising:
   a hydrocarbon; and
   an additive, wherein the additive is a manganese oxide the feed material is adapted to form a liquid slag protective layer comprising at least about 15% by weight of manganese oxide, wherein the feed material comprises petroleum, coke, or biomass.

2. The feed material of claim 1, wherein the feed material is adapted to form the liquid slag protective layer at a temperature of about 1500° C. or higher.

3. The feed material of claim 1, wherein the composition of the liquid slag protective layer comprises at least about 20% by weight of manganese oxide.

4. The feed material of claim 1, wherein the composition of the liquid slag protective layer comprises at least about 25% by weight of manganese oxide.

5. The feed material of claim 1, wherein the additive comprises MnO, $Mn_2O_3$, $Mn_3O_4$, $MnAl_2O_4$, $MnCr_2O_4$ or combinations thereof.

6. The feed material of claim 1, wherein the additive comprises a powder or a slurry.

7. A process for modifying a feed material for a gasifier comprising:
   determining the concentration of iron, magnesium, manganese, or a combination thereof in a hydrocarbon; and
   providing an additive, wherein the additive comprises a sufficient amount of a manganese oxide such that when the additive is mixed with the hydrocarbon and exposed to a temperature higher than the melting temperature of the additive, a liquid slag protective layer comprising at least 15% by weight of manganese oxide is formed,
   wherein the feed material comprises petroleum, coke, or biomass.

8. The process of claim 7, wherein determining the concentration of manganese in a hydrocarbon comprises determining the concentration of manganese in a batch of coal from a particular geographic region.

9. The process of claim 7, wherein providing the additive comprises providing MnO, $Mn_2O_3$, $Mn_3O_4$, $MnAl_2O_4$, $MnCr_2O_4$, or combinations thereof.

* * * * *

UNITED STATES PATENT AND TRADEMARK OFFICE
CERTIFICATE OF CORRECTION

PATENT NO.         : 8,197,566 B2                                      Page 1 of 1
APPLICATION NO.    : 12/330180
DATED              : June 12, 2012
INVENTOR(S)        : Meschter et al.

It is certified that error appears in the above-identified patent and that said Letters Patent is hereby corrected as shown below:

In Column 4, Line 23, delete "mixtures" and insert -- or mixtures --, therefor.

In Column 5, Line 23, delete "EG9150" and insert -- EG9150. --, therefor.

In Column 6, Line 30, in Claim 1, delete "oxide the" and insert -- oxide wherein the --, therefor.

Signed and Sealed this
Thirty-first Day of July, 2012

David J. Kappos
*Director of the United States Patent and Trademark Office*